United States Patent Office 2,785,589
Patented Mar. 19, 1957

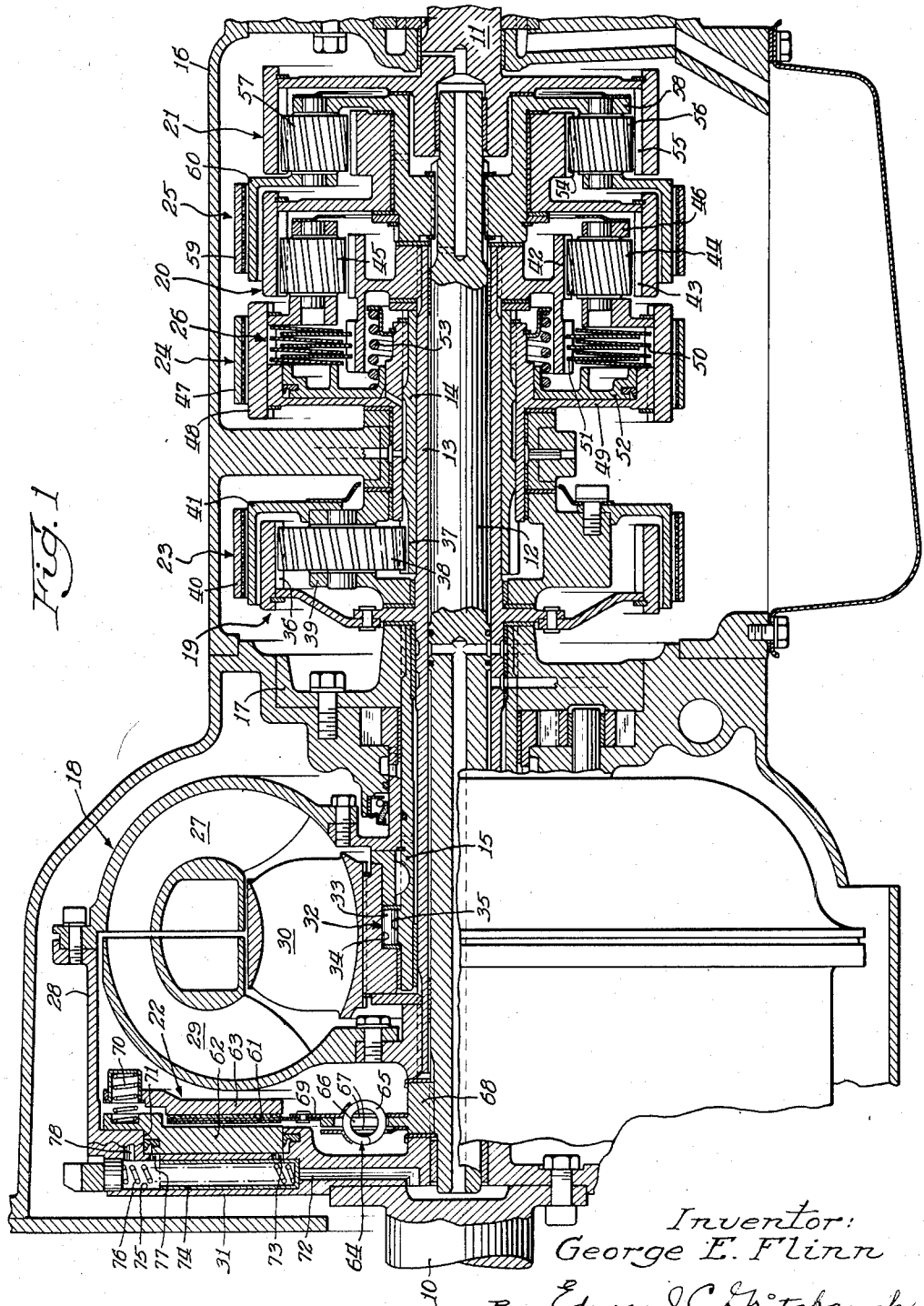

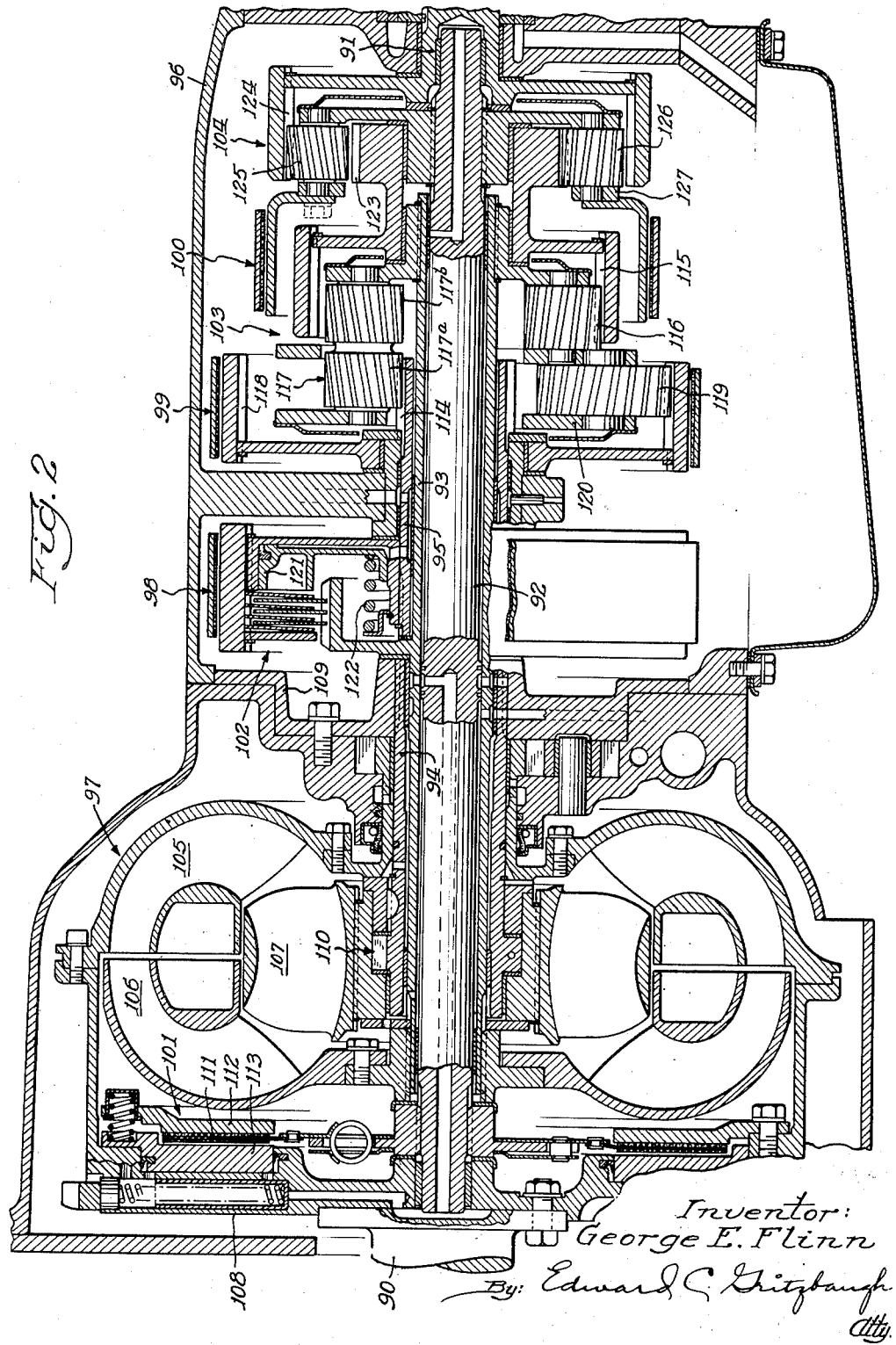

2,785,589
TRANSMISSION
George E. Flinn, Muncie, Ind., assignor to Borg-Warner Corporation, Chicago, Ill., a corporation of Illinois
Application October 20, 1950, Serial No. 191,279
16 Claims. (Cl. 74—732)

My invention relates to transmissions and more particularly to transmissions for automotive vehicles.

It is an object of my invention to provide an improved transmission comprising a hydraulic torque converter through which low and intermediate forward drives may be completed with the torque converter transmitting all of the power from the input shaft of the transmission, and with the transmission being arranged to provide a substantially direct drive through it with only a portion of the power from the input shaft being transmitted by the hydraulic torque converter for thereby decreasing the power losses in the hydraulic torque converter.

It is also an object of the invention to provide an improved transmission of this type having a reverse drive with the reverse drive being of at least as great a ratio as, and preferably greater than, the low speed forward drive so as to provide a relatively great torque for reverse drive.

The invention consists of the novel constructions, arrangements and devices to be hereinafter described and claimed for carrying out the above stated objects and such other objects as will appear from the following description of preferred embodiments of the invention illustrated with reference to the accompanying drawings, wherein:

Fig. 1 is a longitudinal sectional view of a transmission embodying the principles of the invention; and Fig. 2 is a longitudinal sectional view of a modification of the invention.

Like characters of reference designate like parts in the several views.

Referring now to Fig. 1, the transmission illustrated in this figure comprises a drive shaft 10, a driven shaft 11, an intermediate shaft 12 piloted in the shafts 10 and 11, a sleeve shaft 13 rotatably disposed on the shaft 12 and sleeve shafts 14 and 15 disposed on the shaft 13. The driven shaft 11 is rotatably disposed within a transmission housing 16, and the shafts 13 and 12 are rotatably disposed within the housing 16 by means of a housing portion 17 surrounding the shafts. The drive shaft 10 may be held centered by any other suitable means (not shown) with respect to the shafts 12 and 11 in its illustrated position with respect to the housing 16.

The transmission comprises in general a hydraulic torque converter 18, a planetary gear set 19, a second planetary gear set 20, a third planetary gear set 21, a friction clutch 22, friction brakes 23, 24 and 25 and a second friction clutch 26.

The hydraulic torque converter 18 is of conventional construction and comprises a bladed impeller 27 having a casing 28 which forms a fluid container for the torque converter, a bladed rotor or driven element 29 and a bladed stator or reaction element 30. The impeller casing 28 is connected to be driven by the drive shaft 10 through a fly-wheel 31. The rotor 29 is fixed to the sleeve shaft 13, and the stator 30 is rotatably mounted on the sleeve shaft 15. A one-way roller brake 32 of well known construction is provided between the stator 30 and the shaft 15 and comprises a plurality of rollers 33 adapted to wedge between opposite faces 34 and 35 so as to allow the stator 30 to run freely in the forward direction, that is, in the same direction as the drive shaft 10 is rotated but to prevent the rotation of the stator in the opposite direction. The sleeve shaft 15 is splined to the housing portion 17 so as to act as a part of the housing.

The planetary gear set 19 comprises a ring gear 36, a sun gear 37, a plurality of planet gears 38 (one being shown in the drawing) in mesh with the sun gear 37 and ring gear 36 and a carrier 39 for the planet gears. The ring gear 36 is connected with the sleeve shaft 13, as shown; the sun gear 37 is cut on the sleeve shaft 14; and the carrier 39 is rotatably mounted with respect to the shafts of the transmission and is adapted to be braked by means of the brake 23. The brake 23 comprises a brake band 40 adapted to be tightened about a drum 41 with which the carrier 39 is provided.

The planet gear set 20 comprises a sun gear 42, a ring gear 43, a plurality of planet gears 44 (one being shown) in mesh with the sun gear 42 and a plurality of planet gears 45 (one being shown) which are in mesh with the gears 44 and also with the ring gear 43. Although the gear 44 and the gear 45 illustrated in the figure are shown out of mesh, it will be understood that for each of the gears 44 there is a corresponding gear 45 in mesh with it and also in mesh with the ring gear 43, all of the planet gears 44 and 45 not being shown in the figure for the purpose of simplicity of illustration. A carrier 46 is provided for the planet gears 44 and 45.

The sun gear 42 is splined on to the sleeve shaft 13. The brake 24 is effective on the carrier 46 and comprises a brake band 47 adapted to engage a brake drum 48 which is fixed to the carrier. The brake drum 48 is connected by means of an annular part 49 with the sleeve shaft 14 and thereby with the sun gear 37. The clutch 26 comprises discs 50 and 51 respectively fixed with respect to the drum 48 and sun gear 42, and an annular piston 52 slidably disposed in a similarly shaped recess in the part 49 and acting against a spring 53 is provided for engaging the clutch discs with each other so as to connect the sun gear 42 and the planet gear carrier 46.

The planetary gear set 21 is of the double planet gear type similar to the planet gear set 20 and comprises a sun gear 54, a ring gear 55, a set of planet gears 56 in mesh with the sun gear 54, a set of planet gears 57 each of which is in mesh with the ring gear 55 and with one of the gears 56 and a planet gear carrier 58 for the gears 56 and 57. The ring gear 55 is connected with the driven shaft 11 of the transmission, and the sun gear 54 is connected with the ring gear 43 of the planetary gear set 20. The planet gear carrier 58 is splined to the intermediate shaft 12, and the brake 25 is effective on the carrier. The brake 25 comprises a brake band 59 adapted to engage a brake drum 60 which is fixed to the carrier.

The clutch 22 comprises a clutch disc 61 adapted to be engaged between an axially movable pressure plate 62 and an axially stationary pressure plate 63. The clutch disc 61 comprises a vibration dampener 64 which is of conventional construction and includes springs 65 acting between faces 66 and 67 respectively on a hub 68 and an annular part 69. Springs 70 are provided for yieldably holding the pressure plates 62 and 63 spaced from each other. The pressure plate 62 is in the form of an annular piston and is disposed within an annular cavity 71 formed in the fly-wheel 31 so that this pressure plate may be moved to engage the friction disc 61 between it and the fixed pressure plate 63 by the application of fluid under pressure behind the pressure plate 62.

A fluid pressure passage 72 is provided for applying fluid under pressure to the movable pressure plate 62. A passage 73 connects the passage 72 with the cavity 71 for the pressure plate 62, and a movable cylindrical piston 74 is provided within a similarly shaped cavity 75 in the fly-wheel 31 for blocking the passage 73 with respect to the passage 72. A spring 76 is provided for holding the piston 74 in its illustrated blocking position. A passage 77 is provided for connecting the cavity 71 for the piston 62 and the cavity 75, and a third passage 78 is provided for venting the cavity 75.

The transmission illustrated in Fig. 1 and described above provides low, intermediate and high speed forward drives and a reverse drive. All of the power from the drive shaft 10 is transmitted through the hydraulic torque converter 18 in the low and intermediate speed forward drives and in the reverse drive while only a portion of it is transmitted through the hydraulic torque converter in high speed forward drive.

For low speed forward drive, the brake 24 and the brake 25 are engaged for completing the drive. The power train for this drive is from the drive shaft 10 through the fly-wheel 31, the impeller 27, the rotor 29, the sleeve shaft 13, the sun gear 42, the remainder of the planetary gear set 20, with the ring gear 43 being the output member of the gear set 20 and being driven at a reduced speed with respect to the sun gear 42 and in the same direction, the sun gear 54 and the remainder of the planetary gear set 21, with the ring gear 55 and the driven shaft 11 being driven at a reduced speed with respect to the sun gear 54 and in the same direction.

The brake 24 holds the planet gear carrier 46 stationary so that the carrier 46 constitutes the reaction element of the planetary gear set 20, and the brake 25 holds the planet gear carrier 58 stationary so that this element constitutes the reaction element of the planetary gear set 21. It will be observed that there is torque conversion for low speed forward drive in the hydraulic torque converter 18 as well as in the two planetary gear sets 20 and 21. The hydraulic torque converter functions similarly to other converters of this type in causing a driving of the rotor 29 of the torque converter at a greater torque than that which is impressed on the impeller 27, with the reaction element 30 being held stationary by means of the one-way brake 32. When the speed of the rotor 29 increases sufficiently, the stator 30 begins to turn in the forward direction that is, in the same direction of rotation as the input shaft 10 is turned, with the brake 32 releasing, and the hydraulic unit 18 thereafter functions as a simple fluid coupling in which the rotor 29 is driven at substantially the same torque as that impressed on the impeller 27.

The drive in intermediate forward speed is obtained when the clutch 26 and the brake 25 are engaged. The drive in this case is the same as in low speed forward drive except that there is no torque conversion in the planetary gear set 20, and the parts of this gear set all rotate as a unit. The clutch 26 functions to connect the planet gear carrier 46 and the sun gear 42 for locking together all of the elements of this planetary gear set.

Direct drive is obtained by engaging both of the clutches 22 and 26. The clutch 26 locks the planetary gear set 20 so that all of its elements and also the sun gear 54 of the gear set 21 rotate at the same speed, which is the speed of the sleeve shaft 13 and rotor 29 and is substantially the same speed as that of the impeller 27, assuming that the rotor 29 is rotating in its higher speed ranges and the hydraulic unit 18 is functioning at this time as a simple fluid coupling. The clutch 22 is engaged by applying fluid pressure to the movable pressure plate 62 so as to move it and engage the friction disc 61 between the plates 62 and 63, and the center shaft 12 and carrier 58 splined to the shaft 12 are connected by the clutch 22 with the drive shaft 10. Since the sun gear 54 of the rear planetary gear set 21 is driven at substantially the same speed as the drive shaft as has just been explained and the carrier 58 is driven also at the speed of the drive shaft 10, the rear planetary gear set 21 is substantially locked so that all of its elements rotate at substantially the same speed which is the speed of the drive shaft 10, and the ring gear 55 and thereby the shaft 11 are also driven at substantially the same speed as the drive shaft 10. It will be noted that, in this drive, part of the torque proceeds in a path through the torque converter 18, and the remainder of the torque proceeds in a path parallel to the torque converter 18, namely through the clutch 22 and the center shaft 12, and the two paths are combined in the rear planetary gear set 21. Any losses that might occur in the torque converter 18 are thus reduced below the values which would obtain if all of the torque from the drive shaft 10 were passed through the torque converter 18.

The piston 74 and the passages 73, 77 and 78 are provided in connection with the direct drive clutch 22 for the purpose of preventing an undesired engagement of the clutch which might be caused by the action of centrifugal force on fluid within the cavity 71, if this cavity were completely closed by the piston 62. The piston 62 is moved to engage the clutch disc 61 between it and the pressure plate 63 by the application of fluid pressure to the conduit 72, and this fluid pressure acts against the piston 74 and moves it outwardly against the action of the spring 76 whereby the piston first closes off the passage 77 and on further movement opens the passage 73. The passage 77 which constitutes an outlet for the cavity 71 is thus sealed, and the passage 73 constituting a fluid inlet for the cavity 71 is connected with the fluid supply conduit 72. The flow of fluid from the conduit 72, through the cavity 75 and passage 73 to the cavity 71 causes application of the clutch 22 as is apparent. When fluid pressure is subsequently drained from the conduit 72 to disapply the clutch 22, the spring 76 moves the piston 74 inwardly so that it closes the passage 73 and opens the passage 77. Any residual fluid within the cavity 71 is thus drained through the passage 77 from the cavity 71, so that centrifugal force on this fluid cannot cause engaging movement of the piston 62, and this residual fluid is released out of the cavity 75 through the passage 78.

Reverse drive is completed through the transmission by engaging the brakes 23 and 25. The sleeve shaft 13 is driven from the hydraulic torque converter 18 as in low and intermediate forward drives, and the ring gear 36 rotates with the shaft 13. The brake 23 is effective on the carrier 39 and holds it stationary, and the sun gear 37 and sleeve shaft 14 are thereby rotated through the planetary gear set 19 in the reverse direction. The sun gear 42 of the planet gear set 20 is fixed to the shaft 13, and it is thus rotated in the forward direction. The planet gear carrier 46 of the gear set 20 is connected through the drum 48 and part 49 with the sleeve 14 so as to be rotated in the reverse direction along with the sun gear 37, and the speed of rotation of the carrier in this direction is so much greater than the speed of rotation of the sun gear 42 in the forward direction that the ring gear 43 is driven in the reverse direction. The ring gear 43 is connected with the sun gear 54 of the planet gear set 21, and the brake 25 is effective to hold the planet gear carrier 58 from rotation. The planet gear set 21 thus transmits the reverse drive of the sun gear 54 to the ring gear 55 at a reduced speed, and the driven shaft 11 of the transmission is driven at a reduced speed in reverse drive.

For the particular relative size of gears illustrated in Fig. 1, the low speed forward drive provides a ratio of 2.56 to 1; the intermediate speed forward drive provides a ratio of 1.6 to 1; the high speed forward drive is substantially one to one; and reverse drive provides a ratio of 2.97 to 1, these ratios not including any differences of speed due to the action of the hydraulic torque converter and the torque converter being assumed in each case to be driving at a one to one drive. It will be observed that the reverse ratio is greater than the low speed forward drive ratio which is a desirable characteristic of the transmission.

The embodiment of the invention illustrated in Fig. 2 is similar in many respects to that illustrated in Fig. 1 as will hereinafter appear. The Fig. 2 embodiment comprises a drive shaft 90, a driven shaft 91, an intermediate shaft 92, a sleeve shaft 93 rotatably disposed on the shaft 92 and sleeve shafts 94 and 95 disposed on the shaft 93. The shafts are constrained to rotate relative to each other in their illustrated positions within a transmission casing 96.

The Fig. 2 embodiment in general comprises a hydraulic torque converter 97, friction brakes 98, 99, and 100, and friction clutches 101 and 102. The brakes 99, 98 and 100 are respectively quite similar to the brakes 23, 24 and 25 in the first embodiment of the invention, and the clutches 101 and 102 are respectively quite similar to the clutches 22 and 26 in the first embodiment, and hence further details of these mechanisms are believed unnecessary. The transmission comprises also a planetary gear set 103 and a planetary gear set 104.

The hydraulic torque converter 97 is similar in construction to the hydraulic torque converter 18 in the first embodiment and comprises a bladed impeller 105, a bladed rotor 106 and a bladed stator 107. The impeller 105 is connected through a fly-wheel 108 with the drive shaft 90, and the rotor 106 is splined on to the intermediate sleeve shaft 93. The stator 107 is rotatably disposed on the sleeve shaft 94 which is splined to a part 109 fixed to the transmission casing 96, and a one-way brake 110, which is similar in construction to the one-way brake 32 in the first embodiment, is provided between the stator 107 and the sleeve shaft 94.

The friction clutch 101 comprises a driven disc 111 adapted to be clamped between a stationary pressure plate 112 and a movable pressure plate 113 for connecting the drive shaft 90 with the intermediate shaft 92 to which the driven disc 111 is splined. As will be observed, the construction of the clutch 101 is quite similar to the clutch 22 in the first embodiment of the invention.

The planetary gear set 103 comprises a sun gear 114 formed on the shaft 95, a ring gear 115, a plurality of planet gears 116 (one being shown in the drawing) in mesh with the ring gear 115, a plurality of planet gears 117 (one being shown) having gear portions 117a and 117b, a ring gear 118, a plurality of planet gears 119 (one being shown) which are in mesh with the ring gear 118 and a planet gear carrier 120 for the planet gears 117, 119 and 116 which is splined to the intermediate shaft 93. The gear portion 117a of each of the gears 117 is in mesh both with the sun gear 114 and also with one of the planet gears 119, and the gear portion 117b of each gear 117 is in mesh with one of the gears 116. The brake 99 is effective on the ring gear 118 as shown, and the clutch 102 is effective for coupling together the intermediate shaft 93 and carrier 120 with the shaft 95 and sun gear 114, as is apparent. The clutch 102 is of the multiple plate type and is similar to the clutch 26 in the first embodiment and comprises a fluid pressure operated piston 121 acting against a return spring 122 for engaging the plates of the clutch.

The planetary gear set 104 comprises a sun gear 123 which is connected to the ring gear 115, a ring gear 124 which is connected with the driven shaft 91 of the transmission, a plurality of planet gears 125 (one being shown in the drawing) which are in mesh with the ring gear 124, a plurality of planet gears 126 (one being shown) which are in mesh with the sun gear 123 and a carrier 127 for the planet gears 125 and 126. Each of the planet gears 126 is also in mesh with one of the planet gears 125. The brake 100 is effective on the carrier 127, as shown.

The transmission provides low, intermediate and high speeds in forward drive and a drive in reverse. Low speed forward drive is completed by engaging the two brakes 98 and 100. The brake 98 prevents any rotation of the sun gear 114 connected therewith. The intermediate shaft 93 is driven from the drive shaft 90 through the hydraulic torque converter 97, and the carrier 120 connected with the shaft 93 is thereby driven. The ring gear 115 of the gear set 103 is thus driven at a reduced speed with respect to that of the shaft 93 and in the forward direction. The brake 100 functions to hold the carrier 127 of the gear set 104 stationary, and the sun gear 123 of this gear set is driven from the ring gear 115 of the gear set 103 and drives through the gear set 104 to rotate the ring gear 124 at a reduced speed with respect to the speed of the sun gear 123 and in the same direction. The driven shaft 91 of the transmission connected with the ring gear 124 is thus driven at a speed which is reduced with respect to the speed of sleeve shaft 93, and in this drive torque conversion takes place through both of the gear sets 103 and 104 and in the hydraulic torque converter 97.

Intermediate speed forward drive is completed by engaging the brake 100 and the clutch 102. The clutch 102 has the effect of connecting the sun gear 114 with the sleeve shaft 93 which is also connected with the carrier 120. Since the two elements 114 and 120 of the gear set 103 are connected with the same shaft 93, the planetary gear set 103 is locked, and all of its parts rotate as a unit at a 1 to 1 drive with the shaft 93. The sun gear 123 of the gear set 104 is thus driven from and at the same speed as the intermediate sleeve shaft 93, and the ring gear 124 is driven at a reduced speed with respect to that of the sun gear 123, the same as in low speed forward drive. The sleeve shaft 93 is driven as in the latter drive through the torque converter 97 from the drive shaft 90, and the driven shaft 91 is thus driven in intermediate speed forward drive through both the gear set 104 which multiplies torque and the hydraulic torque converter 97 which may multiply torque at the lower speeds of the rotor 106.

High speed forward drive is completed by engaging both of the clutches 101 and 102. The clutch 101 connects the intermediate shaft 92 with the drive shaft 90, and the carrier 127 is thus driven directly from the drive shaft 90. The friction clutch 102, as in intermediate speed drive, locks the planetary gear set 103 so that all of its elements rotate together as a unit, and the sun gear 123 is thus directly driven from the sleeve shaft 93, which at the higher speeds of the driven shaft 91 and rotor 106 rotates at substantially the same speed as the drive shaft 90. Since both the sun gear 123 and the carrier 127 rotate substantially at the same speed as the drive shaft 90, the ring gear 124 rotates also substantially at this speed and the shaft 91 is driven at a substantially 1 to 1 drive with respect to the drive shaft 90. It will be observed that for direct drive, in this embodiment of the invention as in the first embodiment of the invention, part of the power from the drive shaft of the transmission proceeds through the hydraulic torque converter while the rest of the power from the transmission drive shaft is by-passed in a second path around the hydraulic torque converter, the second path in the second embodiment of the invention being through the central shaft 92, and the power is recombined in the planetary gear set 104 for driving the driven shaft 91.

Reverse drive is obtained by engaging the two brakes 99 and 100. The planet gear carrier 120 of the gear set 103, as in the other drives, is driven through the hydraulic torque converter 97 and intermediate sleeve shaft 93. Due to the fact that the planet gears 119 in mesh with the planet gears 117 are considerably larger than the planet gears 116 also in mesh with the planet gears 117, the ring gear 115 is driven in a reduced speed reverse drive with respect to the sleeve shaft 93. The ring gear 118 braked by means of the brake 99 in this instance functions as the reaction element of the planetary gear set 103. The reverse drive at reduced speed of the ring gear 115 is transmitted to the sun gear 123 of the gear set 104 connected therewith, and the power is transmitted through the gear set 104 to the ring gear 124 and driven shaft 91 which are rotated at reduced speed and in the same direction as the sun gear 123.

For a particular embodiment of the Fig. 2 form of the invention with the relative sizes of the gears being substantially as shown, a low speed forward drive having a ratio of 2.67 to 1, an intermediate speed forward drive having a ratio 1.6 to 1, a high speed forward drive having a ratio of substantially 1 to 1 and a reverse drive having a ratio of substantially 3.2 to 1 may be obtained, these ratios not including any differences of speed due to the action of the torque converter and the torque converter being assumed in each case to be driving at a one to one drive. It will be observed that the torque ratio for reverse drive in this embodiment of the invention also is greater than that for the low speed forward drive; and, in the low and intermediate forward drives and in the reverse drive, all of the power from the drive shaft 90 is transmitted through the torque converter 97, while in the high speed forward drive only a portion of it is transmitted through the hydraulic torque converter.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. In transmission mechanism, the combination of a drive shaft, a driven shaft, a hydraulic torque converter driven by said drive shaft, means for drivingly connecting said hydraulic torque converter and said driven shaft and providing a low speed single path power train between said shafts, said means including a reaction element and a brake for braking the reaction element for rendering said means operative to drive the driven shaft from the torque converter thereby completing the power train, means for drivingly connecting said hydraulic torque converter and said driven shaft and providing an intermediate speed power train between said shafts, and means for providing a relatively high speed power train between said shafts and including means for driving said reaction element when said brake is released for dividing the power from said drive shaft into two paths one of which includes said hydraulic torque converter and means for recombining the power from said two power paths and transmitting it to said driven shaft.

2. In transmission mechanism; the combination of a drive shaft; a driven shaft; a hydraulic torque converter driven by said drive shaft; means for driving said driven shaft from said hydraulic torque converter at a reduced speed and including a planetary gear set having a sun gear adapted to be driven from said hydraulic torque converter, a ring gear connected to said driven shaft, first and second planet gears, said first planet gear being in mesh with said ring gear and said second planet gear being in mesh with said sun gear and with said first planet gear and a carrier for said planet gears, and a brake for said carrier for rendering the planetary gear set operative to drive the driven shaft from the torque converter; and a clutch for connecting said drive shaft with said planet gear carrier for providing a dual path high speed drive between said drive and driven shafts when said brake is released with one of the paths including said hydraulic torque converter.

3. In transmission mechanism, the combination of a drive shaft, a driven shaft, a hydraulic torque converter driven by said drive shaft, means for drivingly connecting said torque converter and said driven shaft to drive the latter at a low speed drive and including a first planetary gear set connected for being driven by said torque converter and a second planetary gear set connected in tandem with the first gear set, said second planetary gear set having a driving element driven by said first planetary gear set and a driven element driving said driven shaft, each of said planetary gear sets having a reaction element, a brake for each of said reaction elements for rendering the respective planetary gear set operative, a clutch for locking together two of the elements of said first planetary gear set for locking the gear set so that the second planetary gear set alone is operative to drive said driven shaft at a reduced speed from the torque converter whereby to provide an intermediate speed drive, and a clutch for connecting said reaction element of said second planetary gear set with said drive shaft whereby to provide a dual path high speed drive between said shafts with one of the paths including said hydraulic torque converter and the other path including said last named clutch.

4. In transmission mechanism; the combination of a drive shaft; a driven shaft; means for providing a low speed power train between said shafts and including first and second planetary gear sets connected in tandem and a hydraulic torque converter connected for driving said first gear set; said second planetary gear set having a driving element driven by said first planetary gear set, a driven element connected with said driven shaft, and a reaction element; a clutch for connecting together two of the elements of said first planetary gear set so as to lock the gear set whereby the second planetary gear set is effective to provide an intermediate speed power train between said shafts; and a clutch for connecting said reaction element of said second planetary gear set with said drive shaft so as to provide a dual path high speed power train between said shafts with one of the paths including said hydraulic torque converter.

5. In transmission mechanism, the combination of a drive shaft, a driven shaft, a hydraulic torque converter comprising a pump element connected with said drive shaft, a stator element adapted to be held from rotation, and a turbine element, a first planetary gear set adapted to be driven by said turbine element and comprising a sun gear connected with said turbine element, a ring gear, a first planet gear in mesh with said ring gear, a second planet gear in mesh with said first planet gear and with said sun gear and a carrier for said planet gears, a brake for said planet gear carrier whereby said ring gear is driven at a reduced speed with respect to said sun gear, a second planet gear set having the same elements as said first planet gear set with the ring gear of the second planet gear set connected to drive said driven shaft, the sun gear of the second planet gear set being connected to be driven by said ring gear of said first planet gear set, and a brake for the planet gear carrier of said second planet gear set for rendering this gear set operative to drive its ring gear at reduced speed with respect to its sun gear whereby engagement of the two brakes completes a low speed drive between the torque converter and said driven shaft, a clutch for connecting together two elements of the first planet gear set for locking the gear set so that the turbine element of the converter drives the sun gear of said second planetary gear set directly and provides an intermediate reduced speed drive between said hydraulic torque converter and said driven shaft, and a clutch for connecting said planet gear carrier of said second planet gear set with said drive shaft so as to provide a dual path high speed drive between said shafts when said clutch is engaged and said brakes are disengaged with one of the paths including said torque converter.

6. In transmission mechanism, the combination of a drive shaft, a driven shaft, a hydraulic torque converter comprising a pump element connected with said drive shaft, a stator element adapted to be held stationary, and a turbine element, a first planetary gear set adapted to be driven by said turbine element and comprising a sun gear connected with said turbine element, a ring gear, a first planet gear in mesh with said ring gear, a second planet gear in mesh with said first planet gear and with said sun gear, a carrier for said planet gears and a brake for said planet gear carrier whereby said ring gear is driven at a reduced speed with respect to said sun gear, a second planet gear set having the same elements as said first planet gear set with the ring gear of the second planet gear set connected to drive said driven shaft, the sun gear of said second planet gear set being connected to be driven by said ring gear of said first planet gear set, a brake for the planet gear carrier of said second planet gear set for rendering this gear set operative to drive its ring gear at reduced speed with respect to its sun gear whereby engagement of the two brakes completes a low speed drive between the torque converter and said driven shaft, a clutch for connecting together two elements of the first planet gear set for locking the gear set so that the turbine element of the converter drives the sun gear of said second planetary gear set directly so as to provide an intermediate reduced speed drive between said hydraulic torque converter and said driven shaft, a clutch for connecting said planet gear carrier of said second planet gear set with said drive shaft so as to provide a dual path high speed drive between said shafts when said clutch is engaged and said brakes are disengaged with one of the paths including said torque converter, and a reverse drive planetary gear set comprising a ring gear connected with said turbine element, a sun gear connected with the planet gear carrier of said first planet gear set, a planet gear in mesh with said last named ring and sun gears, and a carrier for said last named planet gear, and a brake for said last named carrier for completing a reverse power train between said turbine element and said driven shaft when it and said brake for said carrier of said second planet gear set are engaged.

7. In transmission mechanism, the combination of a drive shaft, a driven shaft, a hydraulic torque converter comprising a pump element driven by said drive shaft, a stator element adapted to be held stationary, and a turbine element, means for providing a low speed drive between said drive shaft and said driven shaft and including a first planet gear set having a sun gear, a ring gear, a first planet gear in mesh with said sun gear, a second planet gear in mesh with said first planet gear and with said ring gear and a planet gear carrier connected to be driven by said turbine element, a second planet gear set comprising a ring gear connected with said driven shaft, a sun gear connected to be driven by the ring gear of said first planet gear set, a first planet gear in mesh with said last named sun gear, a second planet gear in mesh with the first planet gear and with said ring gear of the second gear set and a planet gear carrier, a brake for the sun gear of said first planet gear set and a brake for said carrier of said second planet gear set for completing said low speed drive, a clutch for locking together two elements of said first planet gear set whereby the second planet gear set is operative to provide an intermediate speed drive between said turbine element and said driven shaft, and a clutch for connecting the carrier of said second planet gear set with said drive shaft so as to provide a dual path high speed drive between said shafts when said first named clutch is also engaged with one of the paths including said torque converter.

8. In transmission mechanism, the combination of a drive shaft, a driven shaft, a hydraulic torque converter comprising a pump element driven by said drive shaft, a stator element adapted to be held stationary and a turbine element, means for providing a low speed drive between said turbine element and said driven shaft and including a first planet gear set having a sun gear, a ring gear, a first planet gear in mesh with said sun gear, a second planet gear in mesh with said first planet gear and with said ring gear and a planet gear carrier connected to be driven by said turbine element, a second planet gear set comprising a ring gear connected with said driven shaft, a sun gear connected to be driven by the ring gear of said first planet gear set, a first planet gear in mesh with said last named sun gear, a second planet gear in mesh with the first planet gear and with the ring gear of the second gear set and a planet gear carrier, a brake for the sun gear of said first planet gear set and a brake for the carrier of said second planet gear set for completing said low speed drive, a clutch for locking together two elements of said first planet gear set whereby the second planet gear set is operative to provide an intermediate speed drive between said turbine element and said driven shaft, a clutch for connecting the carrier of said second planet gear set with said drive shaft so as to provide a dual path high speed drive between said shafts when said first named clutch is also engaged with one of the paths including said torque converter, and means for providing a reverse drive between said turbine element and said driven shaft and including a third planet gear in mesh with the said first planet gear of said first gear set and a ring gear in mesh with the third planet gear and a brake for said last named ring gear for completing the reverse drive when it and said brake for said second planet gear set are both engaged.

9. In transmission mechanism, the combination of a drive shaft, a driven shaft, means providing a low speed single path power train between said shafts and including a hydraulic torque converter in the train and a reaction element, means providing an intermediate speed single path power train between said shafts and including said hydraulic torque converter in the train and said reaction element, both of said means including a brake for said reaction element for rendering each of said means operative to drive the driven shaft from the torque converted to complete the respective power trains, and means providing a high speed dual path power train between said shafts which includes said hydraulic torque converter in one of the paths and a clutch for connecting said reaction element to said drive shaft in the other of said paths.

10. In transmission mechanism, the combination of a drive shaft, a driven shaft, means providing a relatively low speed single path forward power train between said shafts and including a hydraulic torque converter in the train and a reaction element, means providing a reverse speed single path power train between said shafts and including said hydraulic torque converter in the train and said reaction element, means providing an intermediate speed single path forward power train and including said hydraulic torque converter in the train and said reaction element, all three of said means including a brake for braking said reaction element to complete the respective power trains, and means providing a relatively high speed dual path forward power train between said shafts which includes said hydraulic torque converter in one of the paths and a clutch for connecting said reaction element to said drive shaft in the other of said paths.

11. In transmission mechanism, the combination of a drive shaft, a driven shaft, a hydraulic torque converter driven by said drive shaft, means for drivingly connecting said torque converter and said driven shaft and including a first planetary gear set connected for being driven by said torque converter and a second planetary gear set connected in tandem with the first gear set, said second planetary gear set having a driving element driven by said first planetary gear set and a driven element driving said driven shaft, each of said planetary gear sets having a reaction element, a brake for each of said reaction elements for rendering the respective planetary gear sets operative and completing a relatively low speed drive through said torque converter when both brakes are engaged, and a clutch for connecting an element of said second planetary gear set with said drive shaft whereby to provide a dual path relatively high speed drive between said shafts with one of the paths including said hydraulic torque converter and the other path including said clutch.

12. In transmission mechanism, the combination of a drive shaft, a driven shaft, an intermediate shaft, a hydraulic torque converter driven by said drive shaft, means for drivingly connecting said torque converter and said driven shaft and including a first planetary gear set connected for being driven by said torque converter and a second planetary gear set connected in tandem with the first planetary gear set, said second planetary gear set having a driving element driven by said first planetary gear set and a driven element driving said driven shaft and including a reaction element, a brake for said reaction element for rendering said second planetary gear set operative, a clutch for locking together two of the elements of said first planetary gear set for locking the gear set so that the second planetary gear set alone is operative to drive said driven shaft at a reduced speed from the torque converter whereby to provide a relatively low speed drive, and a clutch for connecting said intermediate shaft with said drive shaft, said second planetary gear set being driven by said intermediate shaft with said driven element driving said driven shaft thereby providing a dual path relatively high speed drive between said drive and driven shafts with one of said paths including said hydraulic torque converter and the other path including said last named clutch.

13. In transmission mechanism, the combination of a drive shaft, a driven shaft, an intermediate shaft, a hydraulic torque converter driven by said drive shaft, means for drivingly connecting said torque converter and said driven shaft and including first and second planetary gear means connected for being driven by said torque converter, each of said planetary gear means having a plurality of elements including a reaction element, said second planetary gear means having a driving element driven by said first planetary gear means and a driven element driving said driven shaft, means including a brake for each of said reaction elements for rendering each of said planetary gear means operating whereby when both of said brakes are engaged a low speed power train is completed between said drive and driven shafts through said torque converter, means including a clutch for locking together two elements of said first planetary gear means whereby when said clutch and said brake of said second planetary gear means are engaged an intermediate speed drive is completed between said shafts through said torque converter, and means including a clutch for connecting said intermediate shaft with said drive shaft, said second planetary gear means being driven by said intermediate shaft with said driven element driving said drive shaft thereby providing a dual path high speed drive between said shafts when both of said clutches are engaged and both of said brakes are disengaged, one of said paths in said high speed drive including said hydraulic torque converter and the other of said paths including said last mentioned clutch.

14. In transmission mechanism, the combination of a drive shaft, a driven shaft, an intermediate shaft, a hydraulic torque converter driven by said drive shaft, means for drivingly connecting said torque converter and said driven shaft and including first, second and third planetary gear means connected to be driven by said torque converter, each of said planetary gear means having a plurality of elements including a reaction element, said third planetary gear means having a driven element driving said driven shaft, means including a brake for each of said reaction elements for rendering each of said planetary gear means operative whereby when said brakes for said reaction elements in said second and third planetary gear means are engaged a relatively low speed forward power train is completed between said shafts through said torque converter, a reverse speed drive being completed between said shafts when said brakes for said reaction elements in said first and third planetary gear means are engaged, and means including a clutch for connecting said intermediate shaft with said drive shaft, said second planetary gear means being driven by said intermediate shaft with said driven element thereby providing a dual path relatively high speed forward drive between said shafts, one of said paths in said high speed drive including said hydraulic torque converter and the other of said paths including said last mentioned clutch.

15. In transmission mechanism, the combination of a drive shaft, a driven shaft, an intermediate shaft, a hydraulic torque converter driven by said drive shaft, means for drivingly connecting said torque converter and said driven shaft and including first and second planetary gear means connected for being driven by said torque converter, each of said planetary gear means having a plurality of elements including a reaction element, said second planetary gear means having a driving element driven by said first planetary gear means and a driven element driving said driven shaft, means including a brake for each of said reaction elements for rendering each of said planetary gear means operative whereby when said brakes are engaged a reverse speed power train is completed between said drive and driven shafts through said torque converter, means including a clutch for locking together two elements of said first planetary gear means whereby when said clutch and said brake of said second planetary gear means are engaged a relatively low speed forward drive is completed between said shafts through said torque converter, and means including a clutch for connecting said intermediate shaft with said drive shaft, said second planetary gear means being driven by said intermediate shaft with said driven element driving said drive shaft thereby providing a dual path relatively high speed forward drive between said shafts when both of said clutches are engaged and both of said brakes are disengaged, one of said paths in said high speed drive including said hydraulic torque converter and the other of said paths including said last mentioned clutch.

16. In transmission mechanism, the combination of a drive shaft, a driven shaft, an intermediate shaft, a hydraulic torque converter driven by said drive shaft, means for drivingly connecting said torque converter and said driven shaft and including first, second and third planetary gear means connected to be driven by said torque converter, each of said planetary gear means having a plurality of elements including a reaction element, said third planetary gear means having a driven element driving said driven shaft, means including a brake for each of said reaction elements for rendering each of said planetary gear means operative whereby when said brakes for said reaction element in said second and third planetary gear means are engaged a low speed forward drive is completed between said shafts through said hydraulic torque converter, means including a clutch for locking together two elements of said second planetary gear means whereby when said clutch and said brake of said third planetary gear means are engaged an intermediate speed forward drive is provided between said drive and driven shafts through said torque converter, a reverse speed drive being completed between said shafts when the said brakes for said reaction elements in said first and third planetary gear means are engaged, and means including a clutch for connecting said intermediate shaft with said drive shaft, said second planetary gear means being driven by said intermediate shaft with said driven element driving said drive shaft thereby providing a dual path high speed forward drive between said shafts when both of said clutches are engaged and all of said brakes are disengaged, one of said paths in said high speed drive including said hydraulic torque converter and the other of said paths including said last mentioned clutch.

References Cited in the file of this patent

UNITED STATES PATENTS

| 2,277,214 | Dodge | Mar. 24, 1942 |
| 2,324,713 | McFarland | July 20, 1943 |
| 2,372,817 | Dodge | Apr. 3, 1945 |
| 2,572,007 | Burtnett | Oct. 23, 1951 |
| 2,609,706 | Jandasek | Sept. 9, 1952 |
| 2,679,169 | Duffield | May 25, 1954 |